Feb. 5, 1924.
J. I. C. HEBB
1,482,650
INTERNAL COMBUSTION ENGINE
Filed Sept. 11, 1920
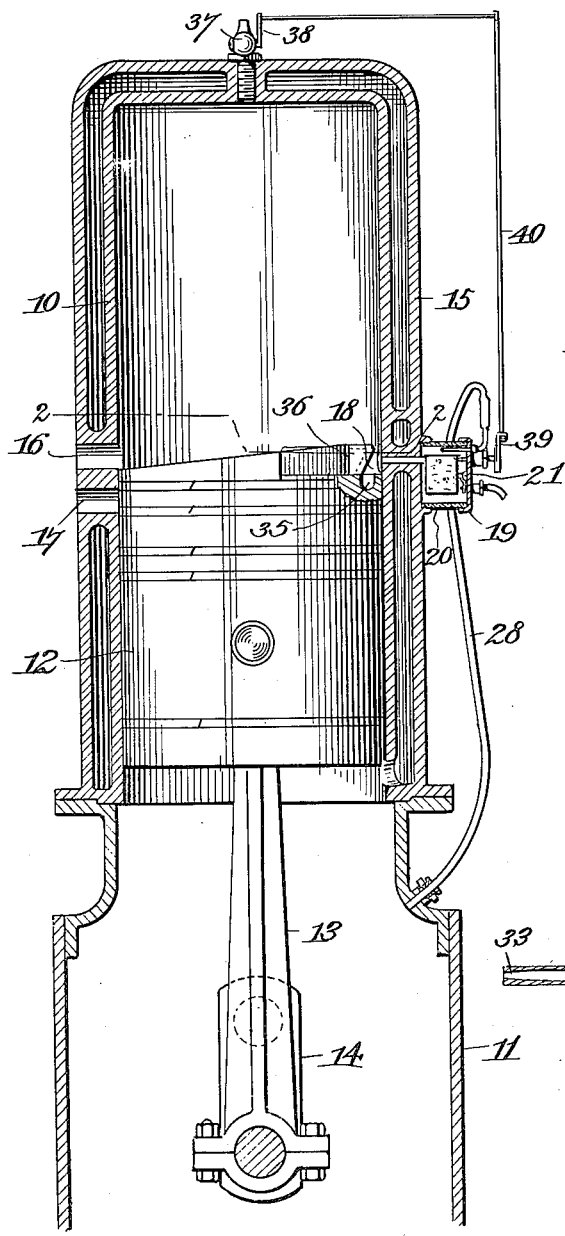
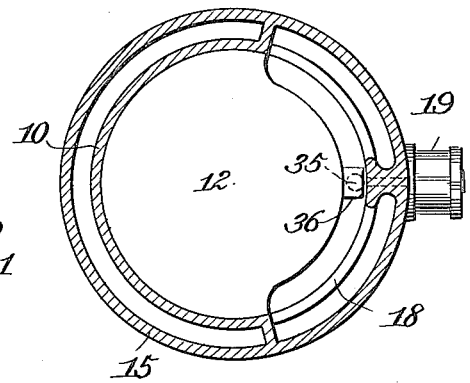
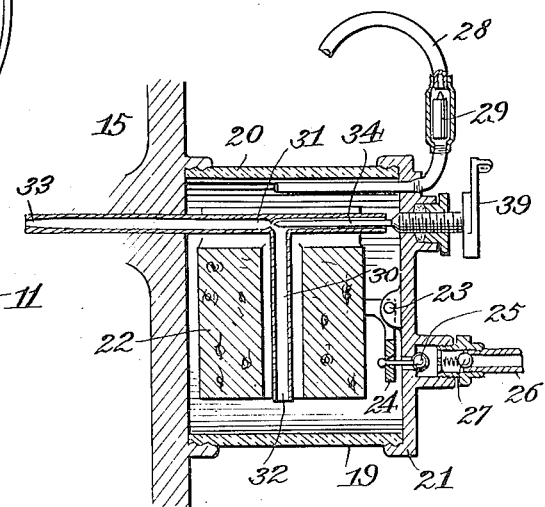
John Ira Cecil Hebb,
INVENTOR.
BY Victor J. Evans,
ATTORNEY Patented Feb. 5, 1924.

1,482,650

UNITED STATES PATENT OFFICE.

JOHN IRA CECIL HEBB, OF BRIDGEWATER, NOVA SCOTIA, CANADA.

INTERNAL-COMBUSTION ENGINE.

Application filed September 11, 1920. Serial No. 409,535.

*To all whom it may concern:*

Be it known that I, JOHN IRA CECIL HEBB, citizen of Canada, residing at Bridgewater, in the county of Lunenburg and State of Nova Scotia, Canada, have invented new and useful Improvements in Internal-Combustion Engines, of which the following is a specification.

This invention relates to internal combustion engines.

More particularly the invention relates to engine of the two-cycle type.

Some of the objects of this invention are:—to combine working principles of different types of engines to derive a distinctive new principle for the obtainment of more thorough efficiency; to obtain a more even running engine of the two-cycle type; to reduce consumption of fuel in obtaining a given amount of power; to be enabled to utilize kerosene or any fuel oil that will vaporize; to permit "throttling down" for running at low speed with the desired evenness of action.

With these and other objects in view the invention resides in the simplification, particular combination and arrangement of parts more fully described in the following specification and illustrated in the accompanying drawings, in which:—

Figure 1 is a sectional elevation of the engine of the present invention, and illustrating some of the features thereof.

Figure 2 is a transverse sectional view on the line 2—2 of Figure 1.

Figure 3 is an enlarged sectional view of the fuel injector.

Referring now to the drawing, it will be apparent that the engine of the present invention will include a cylinder 10, crank case 11, piston 12, connecting rod 13, crank 14. The cylinder 10 is provided with a water jacket 15. The cylinder 10 is also provided with an exhaust port 16, and inlet ports 17 and 18. Air is admitted to the crank case 11 through the inlet port 17 and in the reciprocation of the piston 12, the air in compressed condition is transferred from the crank case to the cylinder through inlet port 18.

A fuel device 19, in the nature of an injector is secured to the cylinder 10. The device 19 comprises an annular member 20 preferably of glass which acts as a float chamber. The member 20 is provided with a cover 21 having liquid tight connection with said member. A float 22 is pivotally mounted to the cover 21 at 23. The float 22 through the intervention of the arm 24 actuates a valve 25. The float chamber 20 is connected by a pipe 26 to the fuel supply tank as shown. A check valve 27 in the pipe 26 permits the flow of fuel into the float chamber 20 when suction is created therein and prevents back flow of fuel when pressure is created in the float chamber 20. The valve 25 is of course actuated by the float 22 to regulate the level of the fuel in the float chamber for the proper feeding of fuel. A pipe 28 opens the float chamber 20 to the crank case. The pipe 28 is provided with a safety float valve 29, so that in case the valve 25 leaked and the level of fuel would rise, the valve 29 would stop the fuel from reaching the crank case 11. A T-shaped member 30 made from tubular parts 31 and 32 is secured in place so that the nozzle end 33 of the part 31 will open into the cylinder 10. A needle valve 34 of the part 31 regulates the flow of fuel through the nozzle 33 and this needle valve therefore is in the nature of a throttle. The piston 12 is provided with a fuel pocket 35 and a deflector 36, which disturbs the air when the piston reciprocates to agitate the fuel deposited in the pocket 35 for the vaporization thereof.

In order that the engine may be readily started by reducing compression in the cylinder 10, the head of the cylinder 10 is provided with a valve 37, the lever 38 of which is connected to a lever 39 of the needle valve or throttle 34 by a rod 40, there being a slip joint between the rod 40 and the lever 39. The arrangement of parts is such that when the valve 37 is opened the throttle valve 34 will be closed and to permit the opening of the throttle valve without affecting the compression valve.

The action of the engine is as follows:—

Starting with the piston at the head of the cylinder, and the crank case filled with air as the piston descends, it compresses the air and at the same time puts pressure on the fuel in the float chamber 20 through the pipe 28. When the piston is at the bottom of its stroke, it uncovers inlet port 17, exhaust port 16, and nozzle 33. This results in the charging of the pocket 35 with fuel and at the same time the filling of the cylinder with air; the old charge having been completely expelled through the exhaust port 16. As the piston moves upwardly, it compresses the air in the cylinder, and at the same time creates a vacuum in both the crank case and the float chamber. This latter action results in fuel being drawn from the supply tank to the float chamber 20. As the piston moves in the completion of its upward stroke compression is increased with the result that the air in the cylinder becomes heated and in such condition it vaporizes the fuel in the pocket 35, which when the piston reaches the peak of its movement upwardly, sprays the vaporized fuel out into the compression space and the highly compressed "red hot" air burns the fuel, thereby causing expansion and the movement of the piston on its downward power stroke. The described operation is repeated in the continuous action of the engine.

What I claim as new and desire to secure by Letters Patent is:—

A two-cycle internal combustion engine including a cylinder, a fuel device including a reservoir, and mechanism including a piston for creating the compression of air adjacent the reservoir to feed a charge of fuel from the device into said cylinder on the downward stroke of the piston substantially at the time the piston reaches the limit of its downward movement; and for transferring the compressed air and increasing the compression thereof in the cylinder upon the upward movement of the piston to ignite the charge of fuel introduced into said cylinder and means operable to shut off the fuel device and to release the compression in the cylinder simultaneously for the purpose specified.

In testimony whereof I have affixed my signature.

JOHN IRA CECIL HEBB.